United States Patent [19]

Steinbiss

[11] Patent Number: 5,228,110

[45] Date of Patent: Jul. 13, 1993

[54] METHOD FOR RECOGNIZING N DIFFERENT WORD STRINGS IN A SPEECH SIGNAL

[75] Inventor: Volker Steinbiss, Pinneberg, Fed. Rep. of Germany

[73] Assignee: U.S. Philips Corporation, New York, N.Y.

[21] Appl. No.: 860,199

[22] Filed: Mar. 26, 1992

Related U.S. Application Data

[63] Continuation of Ser. No. 582,299, Sep. 13, 1990, abandoned.

[30] Foreign Application Priority Data

Sep. 15, 1989 [DE] Fed. Rep. of Germany ....... 3930889

[51] Int. Cl.$^5$ ............................................. G10L 9/08
[52] U.S. Cl. ............................................. 395/2
[58] Field of Search ............................... 381/41–45; 395/2

[56] References Cited

U.S. PATENT DOCUMENTS

| | | | |
|---|---|---|---|
| 4,555,796 | 11/1985 | Sakoe | 381/43 |
| 4,618,983 | 10/1986 | Nishioka et al. | 381/43 |
| 4,794,645 | 12/1988 | Watari | 381/43 |
| 4,829,575 | 5/1989 | Lloyd | 381/41 |
| 4,872,201 | 10/1989 | Sakoe | 381/43 |
| 4,901,352 | 2/1990 | Watari | 381/43 |
| 4,947,438 | 8/1990 | Paeseler | 364/513.5 |

Primary Examiner—Michael R. Fleming
Assistant Examiner—Michelle Doerrler
Attorney, Agent, or Firm—Bernard Franzblau

[57] ABSTRACT

In a known method of recognizing a word string in a speech signal, a new specific organization of the storage locations in the memory containing the trace-back addresses is proposed. Furthermore, a step for generating the information for these storage locations is proposed which makes it possible to determine not only the word string with the best similarity, but also a specific number of further word strings of decreasing similarity. Thus, the additional computing capacity required for determining these further word strings is small relative to the computing capacity required for the remainder of the recognition process.

12 Claims, 4 Drawing Sheets

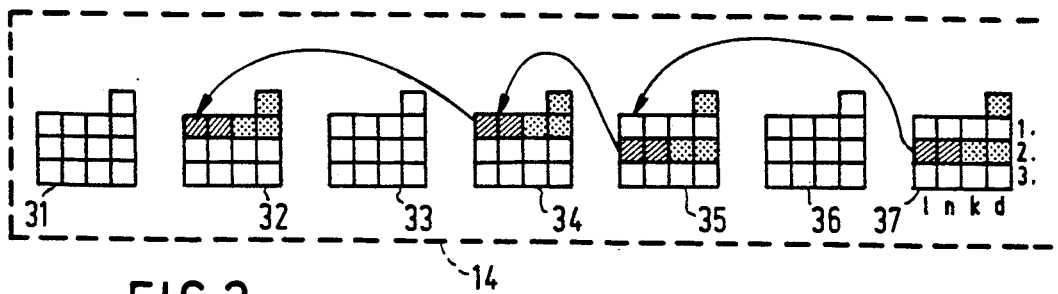
FIG.2a
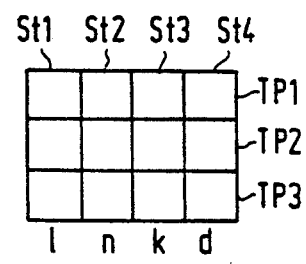
FIG.2b
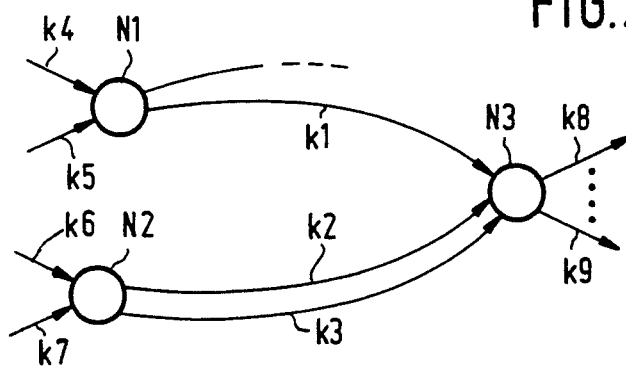
FIG.3
FIG.4

| Adr. | E1 | E2 | E3 |
|---|---|---|---|
| W1 | W0 | who | has, was |
| W2 | W0 | when | has, was |
| W3 | W1 | has | written, mailed |
| W4 | W1 | was | |
| W5 | W2 | has | |
| W6 | W2 | was | |
| W7 | W3 | written | a, an |
| W8 | W3 | mailed | a, an |
| W9 | W7 | a | paper, letter |
| W10 | W7 | an | |
| W11 | W8 | a | letter |
| W12 | W8 | an | |
| W13 | W9 | paper | |
| W14 | W9 | letter | |

METHOD FOR RECOGNIZING N DIFFERENT WORD STRINGS IN A SPEECH SIGNAL

This is a continuation of application Ser. No. 07/582,299, filed Sep. 13, 1990 now abandon.

BACKGROUND OF THE INVENTION

This invention relates to a method of recognizing at least one word string in a speech signal, from which test signals characteristic of consecutive time intervals are derived. These test signals are compared with reference signals of a plurality of given words stored in a first memory in order to form difference values which are summed. The difference sum is stored in a second memory together with a pointer to the memory address where the sequence of difference sums thus obtained has started at the beginning of a word. At least at word boundaries a pointer to the word just ended and to the point where said word begins is stored in a third memory, and at least one word string is determined at the end of the speech signal, starting from at least that word for which the smallest difference sum has been obtained, via the beginning of this word then stored, from the pointer to the preceding word and to its beginning etc. stored there. The invention further relate to an arrangement for carrying out the method.

Such a method is known from DE-OS 32 15 868. In this known method the speech signal is compared with different words through the use of dynamic time adaptation, so that, during the recognition process in the course of the speech signal, a plurality of parallel word strings bearing a resemblance to the speech signal are obtained, which resemblance is dictated by the accumulated difference sum within the relevant word string. Finally, upon the last speech signal a plurality of word strings are finished and the word string yielding the smallest accumulated difference sum is supplied to the output as the sole recognized word string.

However, as a result of different pronunciations, for example, as a result of the partial suppression of word endings, the word string thus obtained is not always the string corresponding to the uttered speech signal. Therefore, in order to improve recognition, it has been proposed to employ speech models which, in conformity with the rules of natural speech, restrict the choice of the word or words which can follow a word just finished. Generally this enables the recognition reliability to be improved. Nevertheless, it is not unlikely that ultimately, as a result of similarly sounding words whose sequence each time complies with the rules of natural speech, a word sequence is supplied to the output as a recognized sentence, which sequence is very similar to but is not an accurate representation of the sentence uttered, while a word sequence reaching a slightly larger accumulated difference sum at the end of the speech signal is actually the correct sentence. In many cases it is therefore effective to output not only the word sequence, i.e. the sentence, with the best similarity but also further sentences of next best similarity, in particular if the word sequence found as the best appears to be incorrect, for example, on the basis of other sources of knowledge which, for example for reasons of complexity, have to be ignored in the recognition process.

By means of the known method this is not readily possible because for every compared word at the end of the speech signal only a single preceding word string is stored, so that it is not possible to determine different word strings whose similarity to the speech signal differs only slightly and which end with the same word.

SUMMARY OF THE INVENTION

Therefore, it is an object of the invention to adapt the method of the type defined in the opening paragraph in such way that a plurality of word strings of next best similarity to the speech signal are determined without any restrictions whatsoever as to the individual word sequences being imposed, except for the restriction that the individual word sequences differ in respect of at least one word.

According to the invention this object is achieved in that for the recognition of N different word strings having the best similarity to the speech signal, the third memory comprises a plurality of storage locations each having at least N sub-locations, of which each sub-location comprises a first position for an address of the third memory, a second position for an address of a sub-location within the storage location, a third position for an indication of a word, and a fourth position for an indication of a difference sum. The addresses in the first two positions represent the pointer to the beginning of a word. For every group of words, of which at least one word reaches the word end for a test signal, a new storage location in the third memory is addressed. This address is stored in the second memory as a pointer to the beginning of every possible following word upon the first reference signal thereof and whose information to be written into the sub-locations is derived from storage locations whose addresses are stored in the second memory for those first words which have concurrently reached the end for the last test signal and which belong to the same group of words. Of said sub-locations, only those sub-locations are used for which the difference sum stored therein, incremented by the increase of the difference sum through the comparison of the reference signal of the relevant first word, is smallest and the sequence of prior words, including the instantaneous word, traversed until then is different, until all of the sub-locations of the new storage location are filled. In deriving the information for each time one sub-location, the address of the storage location, from whose sub-location information is derived, is written into the first position. The pointer to the sub-location, from which the information is derived, is written into the second position. An indication of the relevant first word just ended is written into the third position, and an indication of the incremented difference sum is written into the fourth position. And from the content of all the sub-locations of the storage location, which has been entered during the last test signal of the speech signal, the different word strings are determined and outputted via the indication of the word in the third position, as well as the addresses of storage location contained in the first and the second positions of said sub-locations and the content of their sub-locations etc.

From "Proc. IEEE Int. Conf. on acoustics, Speech and Signal Processing", New York 1988, pp. 410–413, an algorithm for the recognition of coherent speech is known which determines not only the best word sequence but also the word sequence with the second best similarity. However, in order to accomplish this a different recognition principle is employed, namely a multi-stage method, and no reference at all is made to a concrete technical realization, in particular to the allocation of storage locations.

In the method in accordance with the invention the content of the third memory is extended in a specific way such that it is now possible to form a plurality of different word sequences, the steps for the generation of the information for new storage locations of the third memory guaranteeing that only those different word strings of each time the best similarity to the speech signal are examined further. Moreover, the method in accordance with the invention enables speech models to be utilize in which the end of a word cannot be followed by any other arbitrary word of the entire vocabulary, but which can be followed only by words of a specific group, i.e. preferably of a specific syntactic class, dictated by the word just finished or by the starting point of this word. As is known, this enables the recognition reliability to be increased significantly.

In every storage location of the third memory the difference sum itself can be stored at the fourth position of every sub-location. Another embodiment of the invention, which requires less computing time, is characterized in that the absolute value of the difference sum is stored at the fourth position of the first sub-location of every storage location and the difference between the difference sum in this sub-location and the difference sum in the first sub-location is stored at the fourth position of every following sub-location. Thus, in particular if a specific test signal yields only a single word, the differences between the difference sums remain available and only the absolute value in the first sub-location has to be incremented accordingly.

To derive the information for a new storage location in the third memory in the case where, for the same test signal, a plurality of words end simultaneously, the sub-location of the storage locations corresponding to these words should be mixed in such a way that eventually only the sub-locations with the smallest difference sums are employed. In a further embodiment of the invention an effective method of carrying out this mixing process is characterized in that for one of the words reaching the end for the same test signal, from the information of the storage location, whose address has been stored together with the difference sum of said word, further information is derived and is stored at a storage location having a new address in the third memory, and the information of the relevant storage location of every other one of these words for each sub-location is compared successively with the information of all the sub-locations of the new storage location and, if two mutually compared sub-locations indicate the same word sequence traversed so far, the information of the sub-location with the larger difference sum is suppressed, and the non-suppressed information of the just compared sub-location of a word is inserted between those two sub-locations of the new storage location whose difference sum is larger or smaller than the difference sum of the compared sub-location, the information of the sub-locations of the new storage location being shifted by one sub-location, if necessary.

In this way it is not necessary to repeatedly search through the individual sub-locations of each ending word but the process is started with an arbitrary word of a plurality of simultaneously ending words, from whose information are derived the data to be entered of the new address in the third memory. Subsequently, the data derived from the information of the further simultaneously ending words are loaded into the new storage location, the prior data of this new storage location being erased or being shifted out until finally all of the simultaneously ending words of the same group have been processed. This minimizes the time required for combining the data of a plurality of simultaneously ending words.

To check whether the sequence of prior words traversed until then is different for the compared information from two sub-locations, the chain of storage locations of the third memory which follow from the data at the first and the second position of the sub-locations must be traversed each time. In a further embodiment of the invention this can be simplified in that in a fourth memory, each time that information is written into a sub-location of the third memory, an indication of the word string traversed so far and extended by the word just ended is stored at a new address which is stored in the inserted sub-location at the third position instead of an indication of the ended word, the word string traversed so far being determined via the address of the fourth memory, which address is stored at the sub-location from which the information for the sub-location to be inserted is derived.

This requires a further memory, i.e. a fourth memory, but only the corresponding entry in this memory has to be examined to check whether two compared word strings are similar. This saves a substantial amount of processing time. Moreover, at the end of the speech signal the word strings having the best similarity can be read directly from this fourth memory without the word strings having to be determined by tracing back references or indications at the first and the second positions of the sub-locations.

An arrangement for carrying out the method in accordance with the invention, comprises a speech signal processing device for deriving characteristic test signals, a first memory for storing reference signals for words to be recognized, a comparison circuit for comparing each test signal with reference signals in order to form difference values and to form difference sums from added-up difference values, a second memory for storing difference sums and indications of the beginning of the sequence of difference sums for the relevant word, and a third memory which, when a word end is reached, stores the pointer to the beginning of the sequence of difference sums and a pointer to the word just ended. This arrangement is characterized in that for every storage location which is newly addressed when a word end is reached, the third memory comprises a plurality of sub-locations each having four storage positions, there is provided a processing circuit which, for all the words belonging to the same group of words and ending at the same test signal, addresses the same storage location in the third memory and writes into the individual sub-locations information derived from the read-out contents of the sub-locations of such storage locations whose storage address is indicated by the entry corresponding to the relevant ended word in the second memory. The processing circuit derives information only from those sub-locations for which the difference sum stored therein, incremented by the increase of the difference sum as a result of the comparison of the reference signals of the relevant first word, is smallest and for which the sequence of prior words traversed so far, including the instantaneous word, is different.

BRIEF DESCRIPTION OF THE DRAWINGS

Exemplary embodiments of the invention will now be described in more detail with reference to the drawings. In the accompanying drawings:

FIGS. 2a and 2b illustrate the organization of the storage locations of the third memory in the method in accordance with the invention and the trace-back of word strings therein, FIG. 3 shows a part of a graph of a speech model, FIG. 4 is a schematic diagram illustrating the formation of the information of a new storage location of the third memory.

DESCRIPTION OF THE PREFERRED EMBODIMENTS

Figure 1:
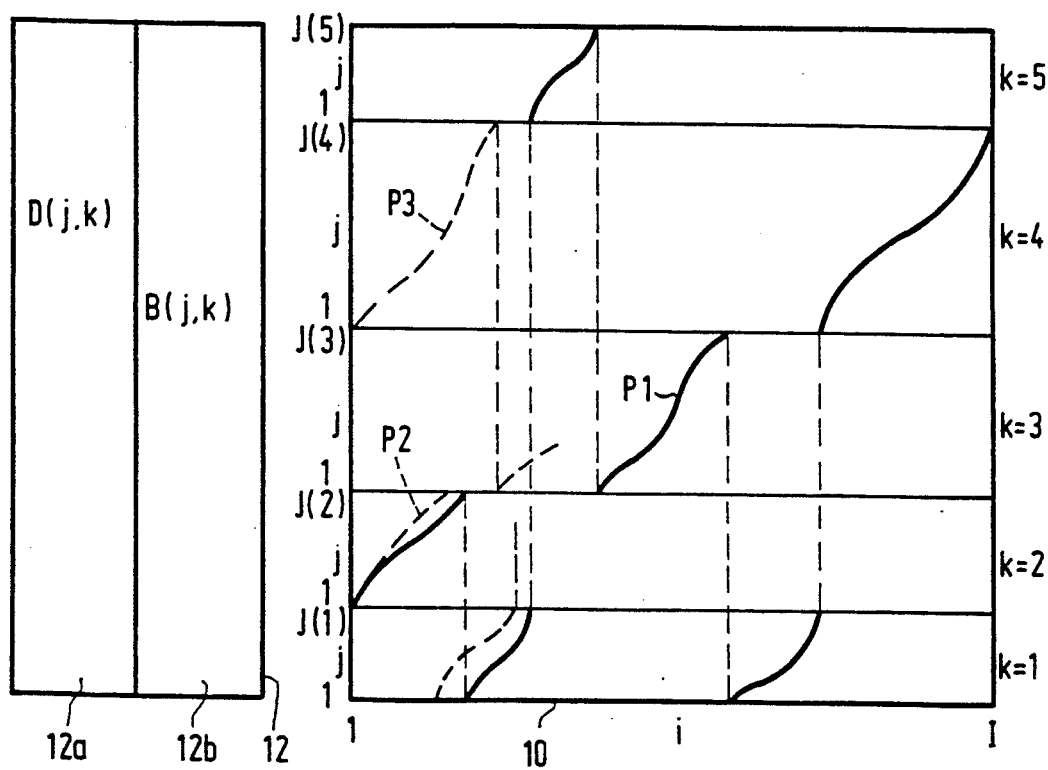
FIG. 1 shows a diagram for determining a single word string.
Figure 1:
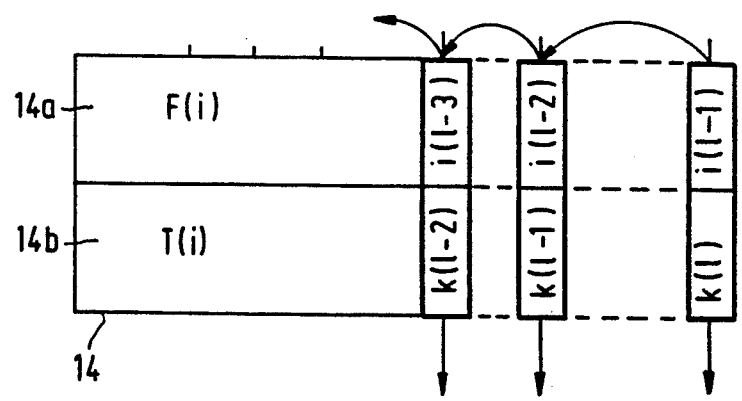

From the speech signal to be examined test signals are derived, generally at regularly spaced instants, for example at intervals from 10 ms to 20 ms. These test signals may be, for example, the short-time spectrum of the speech signal, the fundamental speech frequency, the loudness or similar values, which may have been prepared especially for word recognition. The generation of such test signals is known and therefore is not a part of the invention.

It is known that the speech signal is composed of individual words stemming from a given vocabulary. The words of the vocabulary correspond to a set of K sequences of reference signals derived from individually uttered words. The sequences of the reference signals and hence of the words are indexed $k=1, \ldots K$. The individual reference signals within a sequence k are referenced $j=1, \ldots J(k)$, where $J(k)$ denotes the length of the sequence k of reference signals.

The ultimate goal of the recognition of the words in a coherent word string is to determine a plurality of successions of reference-signal sequences which best match the sequence of test signals derived from the speech signal.

The method of determining a single word sequence which best matches the speech signal, known from the afore-mentioned DE-OS 32 15 868, will be described in more detail with reference to FIG. 1. The test signals i of the speech signal and the reference signals j of the individual sequences k (here five sequences of five words, numbered from 1 through 5, are taken by way of example) define a matrix 10 of matrix points (i, j, k). A local difference value d(i, j, k) is assigned to each matrix point and is a measure of the deviation from or the difference between the corresponding acoustic features. The problem of recognizing coherent word strings can be reduced to the problem of finding that path through the matrix of matrix points (i, j, k) which represents the best match between the test signals and the unknown succession of reference-signal sequences. Stated in other terms, the sum of the difference values d(i, j, k), if applicable incremented by a time distortion value which depends on the direction of the relevant preceding matrix points, is a minimum for all the matrix points on this path. Starting from this optimum path the succession of the reference-signal sequence can be determined unambiguously, as will be apparent from FIG. 1.

The optimum path is determined through the non-linear time adaptation of the test-signal sequence to the individual reference-signal sequences. For this, use is made of the fact that the optimum path through a matrix point (i, j, k) partly consists of the optimum sub-path preceding this matrix point. For this purpose the minimum difference sum D(i, j, k) along all the paths to the matrix point (i, j, k) is determined. Since this difference sum is the sum of the local difference values it can be determined simply step-by-step as the sum of the differences along the optimum path to a preceding point and the local difference value of the matrix point (i, j, k). For the optimum path the preceding point with the minimal difference sum should then be determined. In the known method this yields the following transition rule for transitions within a sequence of reference signals without allowance being made for time distortion values.

$$D(i, j, k) = d(i, j, k) + \min D(i-1, j, k), D(i-1, j-1, k), D(i, j-1, k)$$

Since the optimum path is not yet known the above equation yields a plurality of paths, wherein FIG. 1, in addition to the path P1 which is eventually found to be the optimum path, also shows for example, the path P2 and P3. If not threshold is used for the difference sums, a separate path is in fact obtained for every reference value of all the sequences, which paths in accordance with Bellman's principle of optimality do not intersect, in particular at word boundaries.

In order to determine for a test signal the difference sums for all the reference signals, only a small part of the entire matrix of difference sums of the preceding points is needed, i.e. only the difference sums associated with the preceding test signal $i-1$, as will follow from the above equation. These difference sums D(j, k) are stored in a memory represented symbolically by a block 12, in a section 12a and are overwritten with every new test signal.

In addition, it should be possible to trace back the optimum path, namely for those points of the path situated at every transition from one sequence of reference signals to another, i.e. at the word boundaries. Since the ultimate goal of the prior-art method is to determine the unknown succession of words or sequences of reference signals in the speech signal it is sufficient to determine for which test signal a sub-path terminating at the end point of a sequence of reference signals has started. However, for the word recognition of the word string the details of the sub-path within the sequence of reference signals are not relevant. Initially, the end point of the subpath of the optimum path at the end of each sequence of reference signals is not yet known, for which reason the trace-back information should be preserved for the entire duration of the time adaptation process. For every matrix point (i, j, k) the optimum path has a unique starting point for the first reference signal $j=1$ within this sequence k. Therefore, it is possible to determine for every matrix point a traceback pointer B(i, j, k) as the test-signal address from which the best path to this matrix point (i, j, k) proceeds.

Thus, in the same way as for the difference sums, only one column of trace-back pointers B(j, k) has to be stored each time, i.e. for every reference signal j of each of the sequence k only one storage location 12a for the difference sum and one storage location 12b for the trace-back pointerer are needed. This is illustrated by the left-hand part of FIG. 1.

However, for tracing back it is not necessary to determine the beginning of the sub-path in the relevant sequence, but the end of the preceding sub-path, which, as already stated, directly precedes the beginning of the last sub-path. Thus, the prior-art method is simplified in that instead of using the test-signal address of the beginning, the test signal address of the preceding end point is stored directly in the trace-back pointer B(j, k).

As already stated, only the trace-back pointers at the end points, i.e. the last reference signals J(k) of the individual sequences K, are of interest to enable the sequence of the words to be traced back along the optimum path, because the trace-back pointers B(J(k),k) at the end points again define the end point of every preceding sequence. However, the trace-back pointers at these end points, stored in the memory 12, are overwritten during processing of the next test signal, so that a separate memory is needed for storing the trace-back pointers at the end points of the individual sequences of reference signals. Since such end points can occur for every test signal i, i.e. regardless of a speech model at least one (on account of the said optimality principle), this separate memory should have a storage location for a trace-back pointer for every test signal. In FIG. 1 this separate memory is represented symbolically as a block 14 below the matrix 10, and in the section 14a of this memory the trace-back pointer B(J(k),k) is always stored in the form of the test-signal address F(i) of the preceding end point for which the difference sum D(J(k),k) is minimal.

However, since it is not the end points themselves of the individual sub-path of the optimal path within every reference-signal sequence which are of interest but the word associated with the relevant sequence, the sequence numbers of the reference-signal sequences representing said words should also be stored, together with the relevant initial addresses F(i). The sequence numbers thus stored are designated T(i) and are the sequence numbers of those sequences k at whose end points J(k) the smallest difference sum D(J(k), k) appears relative to all the other sequences for the same test signal.

It follows from FIG. 1 that the test signal address i(l−1) of the end point of the preceding sequence and the sequence number k(l) of the last sequence can then be derived from the values stored for the last test signal I. In the same way the other test signal addresses F(i) stored directly yield the addresses at which the sequence numbers k(l−1), k(l−2) . . . of every preceding sequence as well as the test signal addresses i(l−2), i(l−3) . . . of the end of the sequence ending prior thereto are stored, as is indicated by the arrows connecting the storage locations i(l−1), i(l−2), i(l−3) etc. of the memory 14.

This method cannot be used without any further steps if a speech model is employed in which, for the same test signal, two or more reference-signal sequences can end simultaneously, which sequences can be continued only with specific other sequences on account of the speech model. In this case it is not possible to merely store and proceed with the end of a sequence having the smallest difference sum, because another sequence, ending with a larger difference sum, may eventually yield a smaller difference sum at the end on account of the subsequent better adaptation to the speech signal. However, this problem can be solved easily because the memory 14 in FIG. 4 is addressed separately, i.e. not by the sequence of test signals, in which case the corresponding addresses of the memory 14 should be stored in the section 14a, which address may deviate altogether from the instantaneously current sequence number of the test signal.

However, greater problems occur if not only the word sequence having the best similarity to the speech signal, i.e. having the smallest difference sum at the end, but also the word sequences of the next best similarity to the speech signal, and hence having the next larger difference sum, should be determined and read out. This is because for the same test signal a plurality of words of the same syntactic group may end, which words represent word sequences with successively larger difference sums and which must therefore be stored until it has been ascertained at the end which are actually the N best word sequences having the best similarity to the speech signal.

FIG. 2a shows the organization of a memory corresponding to the memory 14 in FIG. 1. The Figure shows diagrammatically a plurality of memory storage locations 31 to 37 for the trace-back pointers, which storage locations each comprise three multi-position sub-locations for determining the three best word sequences. FIG. 2b shows a single storage location in more detail. In the present example each storage location is divided into three sub-locations TP1, TP2 and TP3 each having four storage positions St1, St2, St3 and St4. This enables the three best word sequences to be determined. If the next best word sequences should also be determined, the number of sub-locations should be increased accordingly, the number of positions remaining the same. The information in the first sub-location TP1 represents the best word sequence with the best similarity to the speech signal, the sub-location TP2 specifies the second best word sequence with the next larger difference sum, and the same applies to the following sub-locations. Adjacent similar storage locations of this memory, which are consequently filled in the case of adjacent test signals or in the case of words of other syntactic groups ending with the same test signal, may obviously contain word sequences with substantially larger or substantially smaller difference sums because the optimum sequence cannot be determined until the end of the speech signal is reached.

The content of the individual positions is as follows. Position St1 contains the address l of a preceding storage location of this memory which follows from the word just ending. Position St2 specifies the sub-location n in the stored word whose address is stored at position St1 and from which the information of the relevant sub-location is derived in a manner to be explained hereinafter. For position St3 it is assumed for the time being that it stores the sequence number k of the sequence of reference signals, i.e. of the instantaneously ended word. Finally, position St4 contains the difference sum reached for the word just ended and the word string preceding this word.

In FIG. 2a the storage locations 31 to 37 comprise an additional storage position which is shown at the top right in each block representing a storage location, and which stores the smallest difference sum of all the sub-locations of this storage location position St4 of every sub-location then containing only the difference between the associated difference sum and said smallest difference sum. However, since in this case the position St4 of the first sub-location TP1 essentially contains the value zero, because the sub-location TP1 implicitly contains the smallest difference sum, this position St4 of the first sub-location TP1 can also be used for storing the absolute value of the smallest difference sum of this storage location, while position St4 in the sub-locations TP2 and following contain the difference d between the difference sum associated with the relevant sub-location and said smallest difference sum. Therefore, the additional storage position for the smallest difference sum shown in the blocks 31 to 37 in FIG. 2a is in fact not necessary.

The process of tracing back a word string preceding an ending word, which ending word may also be the end of the speech signal, is illustrated by way of example by means of arrows in FIG. 2a. Thus, the word string found to be the second best on the basis of the difference sum at the storage location 37 is then read out in that the sequence number k of the last ending word is read out from the third position in the second row of the storage location 37 and by means of the address 1 at the first position of the second row the storage location 35 is addressed. Namely, the second sub-location on the basis of the corresponding indication n at the second position of the second sub-location of the storage location 37, and the sequence number of the preceding word, which number is stored at the third position of the second sub-location of the storage location 35, can be read out. Moreover, by means of the address at the first position of the second sub-location in the storage location 35 the storage location 34 is addressed, namely the first sub-location of the storage location 34 on the basis of the corresponding information at the second position of the storage location 35 and in this way the path is traced back further to the beginning, i.e. up to the first sub-location of the storage location 32, where the first word of the second best word string has ended. In fact, further storage locations belonging to other word strings are situated between the storage locations 30 to 37, of which only the storage locations 31, 33 and 36 are shown by way of example.

The word string which is found to have the smallest difference sum at the storage location 37 may extend, for example, via the storage locations 36, 35, 33 and 31 as described above, namely each time via the first sub-location, because a word string, once it extends through the second sub-location of a storage location, can no longer extend through the first sub-location of a storage location as the speech signal proceeds but only through sub-locations of equal or higher order.

How the information for every new storage location is generated or derived in conformity with that for the storage locations illustrated in FIG. 2a will be explained with reference to FIG. 3 and 4. This is done on the basis of a speech model in the form of a graph comprising nodes and interposed links, which nodes may be regarded as points common to all the links proceeding in the same way. FIG. 3 shows a part of such a speech model, comprising three nodes N1, N2 and N3, with two words or, in the customary speech model terminology, two links k4 and k5 leading to the node N1. The use of the term "links" is more appropriate because one and the same work may be represented by two or more different links, i.e. it may recur at different locations in the speech model, whereas the links are unique.

In a similar way the links k6 and k7 lead to the node N2. In fact, the number of links leading to most nodes increases as the permissible vocabulary is extended.

Further links issue from each node, which means that for example the link k4 in the speech model can continue only with specific further links, of which the link k1 is shown in further detail in FIG. 3. This also applies to the link k5. Similarly, the links k6 and k7 in the present case can continue for example only with the links k2 and k3. It is to be noted that the two nodes N1 and N2 are not necessarily reached simultaneously by the corresponding links and it should also be borne in mind that because of the applied dynamic time adaptation and the resulting increase in the number of paths along every individual link, different, generally successive, test signals will repeatedly reach the end of this link.

The links k1, k2 and k3 now pass to the node N3, i.e. words corresponding to the links k8 to k9 will follow. Depending on the speech model it is possible that after the node N1 another node also may be reached by another link, i.e. a sentence portion which already extends up to the node N1 may be continued in two or more different grammatical ways, but this concerns details of the speech model used, which will not be discussed any further here. In principle, it is also possible to utilize the method described without the use of a speech model, i.e. the speech model then comprises only one node and all the links issuing from this node return to this node.

FIG. 3 does not give any timing conditions, i.e. this Figure does not show when or for which test signal a transition reaches a node. However, it is now assumed that the links k1 and k2 reach the node N3 at the same time, i.e. for the same test signal. Thus, in the matrix corresponding to FIG. 1 several paths combine in one point, which paths denote word sequences traversed until now with a different similarity to the present actual speech signal and some of which paths have to be continued, which requires that tracing back from the end should be possible. The number of paths to be continued is equal to the number of paths along each link terminating at the node N3, i.e. the total number of paths must be reduced. This reduction while maintaining the possibility of tracing back will be described in more detail with reference to FIG. 4. Consequently, this concerns in particular the memory for the relevant initial addresses of the individual sequences to trace back the word sequences found to have the best similarity on the basis of the speech signal, i.e. a memory corresponding to the memory 14 in FIG. 1. Each link, which is unambiguously assigned to a word and hence to a sequence of reference signals, transmits the corresponding address of the storage location in the memory 14 by means of its trace-back pointer B(j, k) formed at the beginning of this link and stored in the section 12b of the memory 12 in FIG. 1. For the link k1 this is assumed to be the address 11 and for the link k2 the address 12.

A new storage location in the memory 14 having the address 13 is read in at the ends of the links k1 and k2. The simplest way to achieve this is to choose the next free storage location.

The content of the storage location 13, i.e. the information to be written therein, is subsequently derived from the storage location 11, whose address, as already stated, is read from the memory 12b at the end of the link k1. The first positions of all the sub-locations of this storage location 11 contain the relevant preceding addresses, the addresses 1a and 1b being indicated here by way of example. The content of the second positions indicates from which sub-location having the addresses 1a and 1b the relevant values have been derived, i.e. in the present example from the first sub-locations of both storage locations. As will be explained hereinafter, the order of the associated link, from which the information of the sub-location has originated, is stored at the third position, i.e. the link k4 has yielded the smaller difference sum S' and the link k5 has yielded a difference sum which is a value d'1 larger. This address 11 is transmitted for all the links issuing from the node N1 for the same test signal, but in the present case only the link k1 is considered. The difference sum S' is used as the value D(j, k) of all the links issuing from the node N1 and, consequently, also of the link k1 at the beginning, i.e. before the comparison of the first reference signal of the link k1 with the instantaneous test signal and in the course of the link it is incremented in conformity with the dynamic time adaptation during the next comparison of test signals with reference signals.

At the end of the link k1 the associated quantity D(J(k1),k) has reached the value S1, which is written at the fourth position of the first sub-location in the storage location 13. The third position of this sub-location stores the order k1, while the second position stores the number of the sub-location of the preceding storage location 11 from which the information is derived, i.e. the value 1. Finally, the address 11 is entered at the first position of the first sub-location. The second and the third sub-locations are loaded in a similar way, the information of the originally second sub-location in the example of FIG. 4 being advanced to the third sub-location because in the second sub-location the information from the second simultaneously ending link k2, i.e. from the storage location having the address 12 stored with this link, namely from the first sub-location, has been inserted subsequently because the difference sum S'' incremented by the difference values along the link k2 is smaller than the difference sum initially present in the second sub-location of the storage location 11. The absolute difference sum at the end of the link k2 is then referred to the difference sum S1 of the first sub-location and yields the difference d1, while the difference value d'1 from the second sub-location of the storage location 11 directly corresponds to the difference value d2 stored in the last position of the third sub-location of the storage location 13. The original content of the third sub-location of the storage location 13, which originated from the third sub-location of the storage location 11, is now shifted out by the entry from the storage location 13, because it represented too large a difference sum. Similarly, no information for the storage location 13 has been derived from the second and the third sub-locations of the storage location 12.

The address 13 is stored as the trace-back pointer B(1, k) together with the first reference value of each of the links k8 to k9 issuing from the node N3 and is thus transferred, the corresponding value D(1, k) being formed accordingly from the difference sum S1 and the comparison with the first reference signal of each of the links.

It is to be noted that in the case where for the test signal being considered at least one further link ends at the same time at a node other than the node N3, a further storage location, for example having the address 14, must be provided, for which the information to be entered is derived in the same way as described hereinbefore. In general, a storage location must be provided for every node where at least one link terminates for the same test signal.

However, before the information from the first sub-location of the storage location 12 is loaded into the second sub-location of the storage location 13 it should be ascertained, suitably starting from the last sub-location of the storage location 13, whether this information does not relate to a word string which has reached the storage location 13 via the storage location 11, because eventually different word sequences of different similarity to the speech signal should be determined. In the case that the information to be loaded into a sub-location represents a word sequence already present at one of the sub-locations of this storage location, this information should be suppressed, i.e. the information representing the larger absolute difference sum. If this results in a sub-location of the storage location 13 being vacated, it may be possible to write the information to be inserted into this free sub-location if this is possible on the basis of the difference sums of the other sub-locations and the sub-location to be inserted. In this case the sub-locations already available in the storage location 13 need not be shifted when a new sub-location is to be inserted.

In order to ascertain whether a word sequence corresponding to the word sequence to be inserted is already present at the storage location 13, it should first be checked whether the link issuing from the storage location 12 is already present at the third position of one of the sub-locations in the storage location 13 and, if this is the case, the corresponding prior sequences of links should be traced back to determine whether these sequences of links differ in at least one position or correspond up to the beginning.

This rather intricate tracing back can be avoided if at the third position of each sub-location, instead of the order of the last ending link, an address of an additional word sequence memory is stored, in which memory for every end of a link information about the link, sequence traversed up to and including said link is stored at a new storage location, if this memory does not yet contain this word sequence. This has the additional advantage that at the end of the speech signal the individually determined word sequences in the third positions in the last storage location of the memory 14 then read in can be read out directly via said additional word sequence memory in conformity with their increasing similarity to the speech signal.

Figures 5, 6:
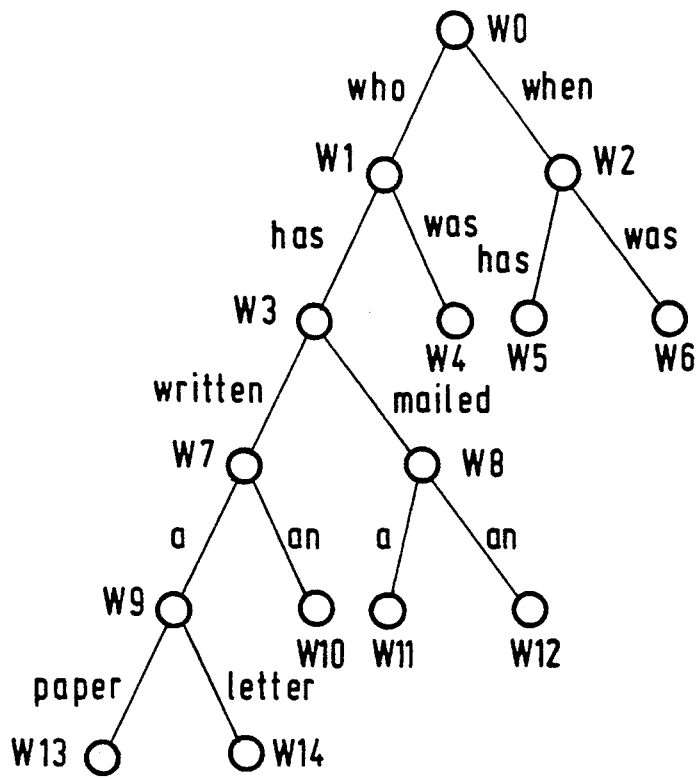
FIG. 5 shows a possible concatenation of word sequences obtained for an exemplary speech signal, FIG. 6 symbolically represents the content of the fourth memory corresponding to the concatenation of words as shown in FIG. 5.

A possible organization of this word sequence memory will now be described in some more detail with reference to FIGS. 5 and 6. FIG. 5 by way of example gives some word sequences which may occur in the process of recognizing a speech signal, only a few word sequences being traced for the sake of simplicity. The circles W1 to W2 denote the ends of individual words and represent addresses of a word sequence memory whose content is illustrated in FIG. 6.

Starting from a starting point W0, where consequently no word has ended yet, inter alia the two words "who" and "when" are compared with the speech signal, for example on the basis of a given speech model. When the word "who" has ended, an entry is made at the address W1 of the word-sequence memory shown in FIG. 6, which entry comprises the section E1 with the back-pointer to W0 and the section E2 with the link "who". The section E3 remains vacant for the time being. When the word "when" has ended, for example at a slightly different instant, i.e. for another test signal, a further entry is made in the word-sequence memory of FIG. 6 at the address W2, the back-pointer in the section E1 also indicating the starting point W0 and the section E2 containing the link "when".

Now a comparison is made, inter alia, with the words "has" and "was". When the word "has", which issues from point W1, is the next word reaching the end, a new entry is made in the word sequence memory at the address W3, which contains the back-pointer to W1 in the section E1 and the link "has" in the section E2. At the same time the link "has" is entered as the link issuing from point W1 in section E3 at the address W1. If subsequently the word "was" issuing from point W1 ends, it is checked whether this link is already present in section E3 at this address W1. As it is assumed that this is not yet the case an entry is made in the word-sequence memory at the address W4, which entry comprises the back-pointer to W1 in the section E1 and the link "was" in the section E2. Moreover, the entry in the section E3 at the address W1 is completed by entering the link "was". In the same way the new address W5 and W6 are produced if the words "was" and "has" issuing from point W2 end, the corresponding words being also completed at the address W2 in section E3.

Now inter alia the words "written" and "mailed" are compared starting from point W3. For simplicity the words which actually follow the points W4 to W6 are not considered. When the word "written" ends a new entry W7 is made in the word sequence memory, which entry comprises the back-pointer to W3 in section E1 and the link "written" in the section E2. This word is also completed in the section E3 at the address W3. The same applies to the other word "mailed", which is entered at the address W8, and to the other words, which produce entries at the addresses W9, W10, W11 and W12. Every section E3 at the preceding address is completed similarly.

If now, for example, starting from point W1, the word "has" ends at a later instant via another path, it is possible to ascertain immediately that this word sequence already exists via the initial address W1 from the entry E3.

At the end of the speech signal it is now possible to determine each time the last word as well as the preceding end of the word string and via this the preceding word etc. from the last storage location in the third memory 14 by means of second section E2 of the addresses contained in the third positions of all the sub-locations of the word-sequence memory and to read these out as the word sequence.

Figure 7:
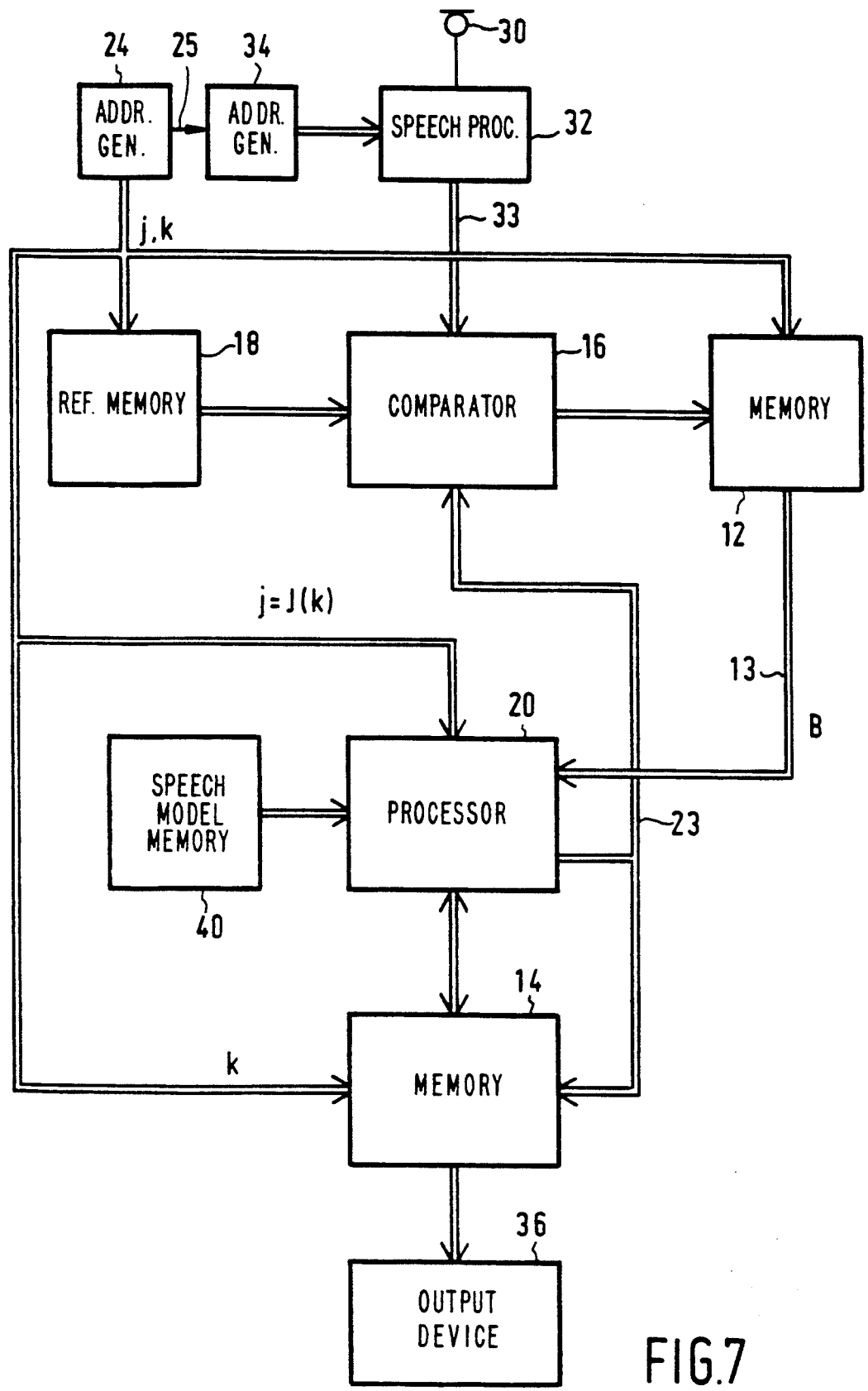
FIG. 7 is a block diagram of an arrangement for carrying out the method in accordance with the invention.

In the block diagram shown in FIG. 7, the speech signal to be recognized is applied to a microphone 30 and converted into an electric signal which is fed to a speech-signal processing circuit 32. In this circuit characteristic test signals are derived from the speech signal, for example, the amplitudes of the speech signal over short successive time intervals of, for example, 10 ms in a plurality of adjoining spectral ranges. These signals are stored temporarily, because generally real-time processing is not possible in the case of a larger vocabulary. This intermediate memory, not shown, is addressed by means of an address generator 34.

Subsequently, the test signals are applied to a comparator circuit 16 via the connection 33, which circuit at the same time receives reference signals from a reference memory 18. This reference memory 18 is controlled by an address generator 24, which successively reads out all the reference signals or, if threshold values are used, reads out specific ones of the reference signals stored in the reference memory 18. Once all of the relevant reference values have been applied to the comparator circuit 16 the address generator 24 supplies a signal to the address generator 34 via the connection 25 so that the next test signal is now applied to the comparison circuit 16.

The last-mentioned circuit compares each test signal with the applied reference signals and forms a difference value for each reference signal applied, and in conformity with the rules of dynamic programming as known, for example, from DE-OS 32 15 868, the difference sums are derived from these values and stored in a memory 12, which is also addressed by the address generator 24. Moreover, a back-pointer is stored in this memory at each address to indicate at which position or for which signal a sequence of difference signals traversing the relevant word has started in this word.

At the end of each word, i.e. when the address generator 24 addresses the last reference signal $j=J(k)$ of the word k, a processing circuit 20 is actuated, which reads the back-pointer B stored at this address from the memory 12 via the connection 13 and drives a storage location in the memory 14 at the address corresponding to said back-pointer to read out this storage location via the connection 21. When the word just ended is the first ending word in the relevant test signal or, if a speech model is used, the first word of a gramatically associated group of words, which is determined by the processing circuit 20 by means of a speech model memory 40, the next free storage location in the memory 14 is addressed via the connection 23 and the content of the read-out storage location is stored therein. However, if the word just ended is not the first word for this test signal the content of every sub-location of the storage location of the memory 14 that is being read is checked to determine whether the difference sum contained therein and incremented by the word traversed instantaneously is smaller than the difference sum of a sub-location of the storage location in the memory 14 which for this test signal has been newly entered for the first ending word, for which the content of this newly entered word has been retained, for example, in the processing circuit 20. When such a sub-location is found, its content and the content of the next sub-locations is advanced by one sub-location, the content of the last sub-location disappearing and the content just compared of the sub-location to be read in is entered at the sub-location thus vacated. This is effected consecutively for all the sub-locations until a sub-location is found for which the incremented difference sum stored therein is larger than that of the last sub-location of the storage location read in last. During read in of a new sub-location the contents of the individual storage location are obviously updated in the manner described above, the number k of the word just ended being derived from the address generator 24.

Instead of reading-in a new storage location in the memory 14 for the first ending word in the case of a new test signal the entire content of this storage location may first be stored intermediately in the processing circuit 20 and may be completed with the next ending words for this test signal, until all of the reference signals of all of the words of the reference memory 18 have been compared with the instantaneous test signal, at least if comparison is allowed in the case where thresholds are used for the difference sums. The information thus obtained can then be loaded into the new storage location in the memory 14. An essential feature is that the individual sub-locations of this storage location are arranged in the sequence of their difference sums.

In each case the address of this newly read-in storage location in the memory 14 is also applied to the comparator circuit 16 via the connection 23, which circuit writes this address into the memory 12 as the backpointer B for all of the newly beginning words. In this way the memory 14 is read in succession until the last test signal of the speech signal to be recognized has been compared, and after this the recognized word sequence is produced by the processing circuit 20 by reading out the memory 14 as described hereinbefore and is applied to an output device 36, for example a printer or a memory or even a further processing circuit for further processing of the recognized sentence.

It is obvious that the comparison circuit 16 and the processing circuit 20 together may be constituted by a programmable computer, which then also comprises, for example, the address generators 24 and 34, and alternatively the individual memories, in particular the two memories 12 and 14, may be formed by corresponding address sections of a common memory.

I claim:

1. A method of recognizing N (N>2) different strings of words in a speech signal having an end, from which consecutive test signals characteristic of consecutive time intervals of the speech signal are derived, which method comprises:
    comparing consecutively each of said test signals with reference signals of a plurality of given words stored in a first memory, each word corresponding to a sequence of reference signals including a first and a last reference signal, in order to form a number of difference values for each test signal,
    summing the difference values to form difference sums, each difference sum resulting from comparisons of consecutive test signals up to a present test signal with different reference signals of a number of words, thus forming a number of sequences of difference sums,
    storing each of the difference sums in a second memory at an address assigned to a reference signal the comparison of which with an instantaneous test signal results in the difference sum to be stored, together with a backpointer which had been stored with the difference sum of the same sequence of difference sums as the previous test signal, except for a first reference signal of each sequence of reference signals
    at each comparison of a test signal with a last reference signal of at least one of the sequences of reference signals, additionally
    addressing at least one empty storage location of a third memory comprising a plurality of addressable storage locations each having at least N numbered sub-locations, wherein each sub-location comprises a first position, a second position, a third position, and a fourth position,
    storing the address of each said empty storage location as a backpointer in the second memory at addresses assigned to the first reference signal of all sequences of reference signals the corresponding words may follow the word to which the relevant last reference signal corresponds, thus forming concatenations of words,
    storing in the sub-locations of the addressed empty storage location information which is partially derived from other storage locations of said third memory whose addresses are indicated by the backpointer stored in the second memory at addresses assigned to the relevant last reference signal, thereby selecting only N sub-locations of said storage locations for which the difference sum whose indication is stored in any of said N sub-locations, incremented by the sum of the difference values obtained through the comparison of the last consecutive test signals with the relevant sequence of reference signals, is smaller than for the other sub-locations and for which the concatenations of prior words, including the word corresponding to the relevant last reference signal, are different,
    said information to be stored comprising the address of the storage location, from whose sub-location information is derived, to be written into the first position, the number of the sub-location, from which the information is derived, to be written into the second position, an indication of the word corresponding to the relevant last reference signal to be written into the third position, and an indication of the difference sum of the sub-location from which information is derived, incremented by the sum of the difference values obtained through the comparison of the last consecutive test signals with the relevant sequence of reference signals, to be written into the fourth position,
    at the end of the speech signal determining N different sequence of reference signals with the smallest difference sum to the speech signals by starting backward from a different sub-location of the storage locations of said third memory which have been written during the test signal at the end of the speech signal via the indication of the address of the storage location and of the number of the sub-location contained in the first and second position of the relevant sub-location, thereby each time outputting the word indicated in the third position of that sub-location.

2. A method as claimed in claim 1, wherein an absolute value of the difference sum is stored at the fourth position of the first sub-location of every storage location and the difference between the difference sum at this first sub-location and the difference sum of the first sub-location is stored at the fourth position of every following sub-location.

3. A method as claimed in claim 2 which further comprises, when comparing the last reference signal of more than one sequence of reference signals with the same one of the test signals
    storing in sub-locations of an addressed empty storage location information for the last reference signal of a first sequence of reference signals,
    deriving information for the last reference signal of each further sequence of reference signals,
    comparing the derived information with the information of all the sub-locations of the addressed storage location of the third memory and, if two mutually compared sub-locations indicate the same concatenation of words traversed so far, the information of the sub-location with the larger difference sum is suppressed, and the non-suppressed information of the just compared sub-location of a word is inserted between two sub-locations of the new storage location whose difference sum is larger or smaller than the difference sum of the compared sub-location, the information of the sub-locations of the new storage location being shifted by one sub-location, if necessary.

4. A method as claimed in claim 3, wherein,
in a fourth memory, each time information is written into a sub-location of the third memory, an indication of the word string traversed so far and extended by the word just ended is stored at a new address which is stored in the sub-location at the third position instead of an indication of the ended word, and determining the word string traversed so far via the address of the fourth memory which address is stored at the sub-location from which the information for the sub-location to be inserted is derived.

5. A method as claimed in claim 2 wherein,
in a fourth memory, each time information is written into a sub-location of the third memory, an indication of the word string traversed so far and extended by the word just ended is stored at a new address which is stored in the sub-location at the third position instead of an indication of the ended word, and determining the word string traversed so far via the address of the fourth memory, which address is stored at the sub-location from which the information for the sub-location to be inserted is derived.

6. A method as claimed in claim 1 which further comprises, when comparing the last reference signal of more than one sequence of reference signals with the same one of the test signals
storing in sub-locations of an addressed empty storage location information for the last reference signal of a first sequence of reference signals,
deriving information for the last reference signal of each further sequence of reference signals,
comparing the derived information with the information of all the sub-locations of the addressed storage location of the third memory and, if two mutually compared sub-locations indicate the same concatenation of words traversed so far, the information of the sub-location with the larger difference sum is suppressed, and the non-suppressed information of the just compared sub-location of a word is inserted between two sub-locations of the new storage location whose difference sum is larger or smaller than the difference sum of the compared sub-location, the information of the sub-locations of the new storage location being shifted by one sub-location, if necessary.

7. A method as claimed in claim 1 wherein,
in a fourth memory, each time information is written into a sub-location of the third memory, an indication of the word string traversed so far and extended by the word just ended is stored at a new address which is stored in the sub-location at the third position instead of an indication of the ended word, and determining the word string traversed so far via the address of the fourth memory, which address is stored at the sub-location from which the information for the sub-location to be inserted is derived.

8. A method as claimed in claim 1 wherein the words which may follow a preceding word are restricted according to a language model which comprises forming groups of words, wherein for every group of words, of which at least one corresponding last reference signal is compared with a test signal, addressing a new storage location in third memory, each address being stored in the second memory only at addresses assigned to the first reference signal of all sequences of reference signals for which the corresponding words may follow the relevant group of words, information to be written into the sub-locations of the addressed storage location of the third memory being derived only from storage locations whose addresses are stored as backpointer in the second memory for the last reference signal of those sequences of reference signals whose corresponding words belong to the relevant group of words.

9. A method of deriving $N \geq 2$ different strings of words from a speech signal, said method comprising the steps of:
at recurrent instants sampling said speech signal for generating a series of test signals;
comparing signal-by-signal said test signals and various series of reference signals that each represent a vocabulary word, said comparing producing a difference sum and a backpointer for each series of reference signals;
upon termination of any series of reference signals, reading the contents of a previous storage location indicated by said backpointer of the terminating series, said storage location having N sub-locations each containing a previous difference sum and further data and being assigned to a different preliminary recognized string of words, and adding the difference sum produced for the relevant terminating series and said previous difference sums of said storage location to derive aggregate difference sums;
comparing said aggregate difference sum of any series of reference signals which terminate at the same test signals and selecting N minimum aggregate difference sums which are derived from difference sums of sub-locations assigned to different preliminary recognized strings of words;
in a new storage location also having N sub-locations, storing in each sub-location consecutively according to their value one of said selected aggregate difference sum together with further data comprising the backpointer of the relevant terminating series, an indication to the sub-location of the storage location from which the relevant aggregate difference sum is derived and an indication to an associated word represented by the relevant terminating series; and
deriving said N strings of words by starting a tracing back from a last stored new storage location via the backpointers and the associated words.

10. A method as claimed in claim 9, wherein for a plurality of series of reference signals terminating at the same test signal, said comparing and selecting is executed by
in a first step, storing in the sub-locations of said new storage location all aggregate difference sums together with said further data which are derived from a first previous storage location indicated by the backpointer of a first terminating series of said plurality, and
in a second step, consecutively for each further terminating series of said plurality, comparing preliminary recognized strings of words assigned to sub-locations of previous storage locations indicated by the backpointer of each further terminating series with such strings assigned to sub-locations of said new storage location, discarding aggregate difference sums assigned to the same preliminary recognized string of words except a minimum sum and inserting not discarded difference sums together with said further data into said new storage location in sub-locations between such sub-locations containing next higher and lower difference sum compared to the relevant difference sum to be inserted, while shifting the contents of sub-locations containing higher difference sums, if necessary.

11. A method as claimed in claim 9 wherein the words which may follow a preceding word are restricted according to a language model which comprises forming groups of words, storing in a new storage location only aggregate difference sums derived from previous storage locations indicated by backpointers which are produced by a series of reference signals representing words of the same group of words, taking a separate new storage location for each different group of words.

12. An apparatus for deriving $N \geq 2$ different strings of words from a speech signal, according to the method as claimed in claim 9, said apparatus comprising:

means for sampling at recurrent instants said speech signal so as to generate a set of test signals;

comparing means fed by said sampling means and provided with first storage means for storing a set of series of reference signals, each such series representing a vocabulary word, said comparing means producing difference sums and backpointers each assigned to a series of reference signals;

control mans fed by said comparing means each time a series of reference signals is terminating and provided with second storage means having a number of locations, each having N sub-locations, each storing a difference sum and further data, said control means reading a storage location indicated by a backpointer fed by said comparing means, adding the difference sum fed from the comparing means to each difference sum of the sub-locations of the read out storage location to each time produce an aggregate difference sum, selecting N minimum aggregate difference sums, storing back the selected aggregate difference sums and further data into sub-locations of a new storage location, and at the end of said speech signal, starting from a last stored storage location tracing back via a backpointer and outputting strings of words.

* * * * *